April 17, 1934.   H. R. HOLMES   1,955,585
SNOWPLOW
Filed March 24, 1933   2 Sheets-Sheet 1
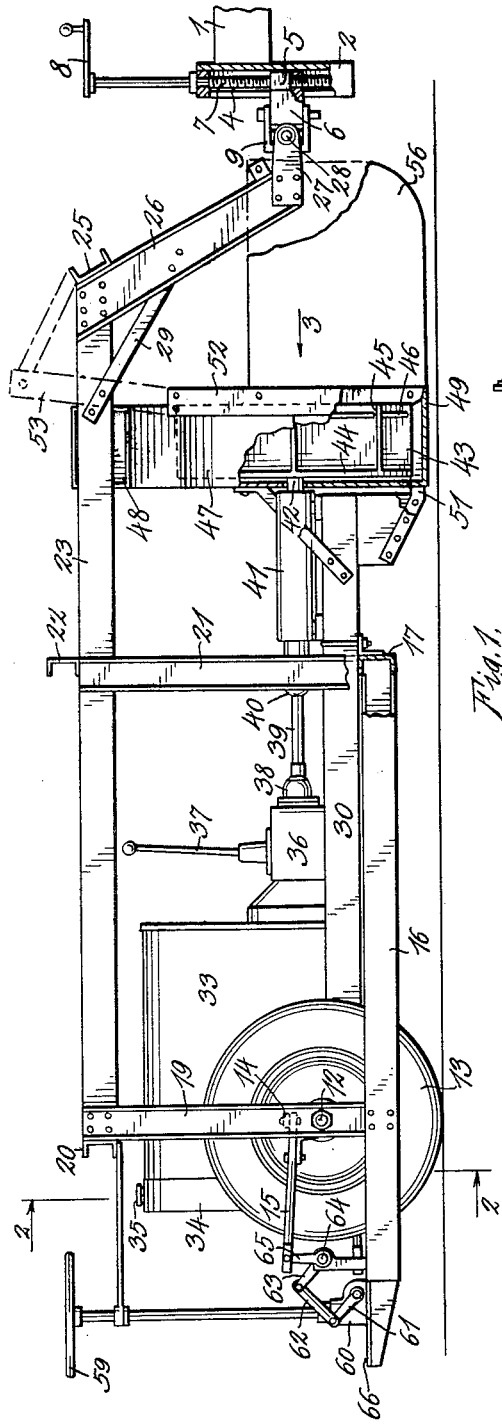
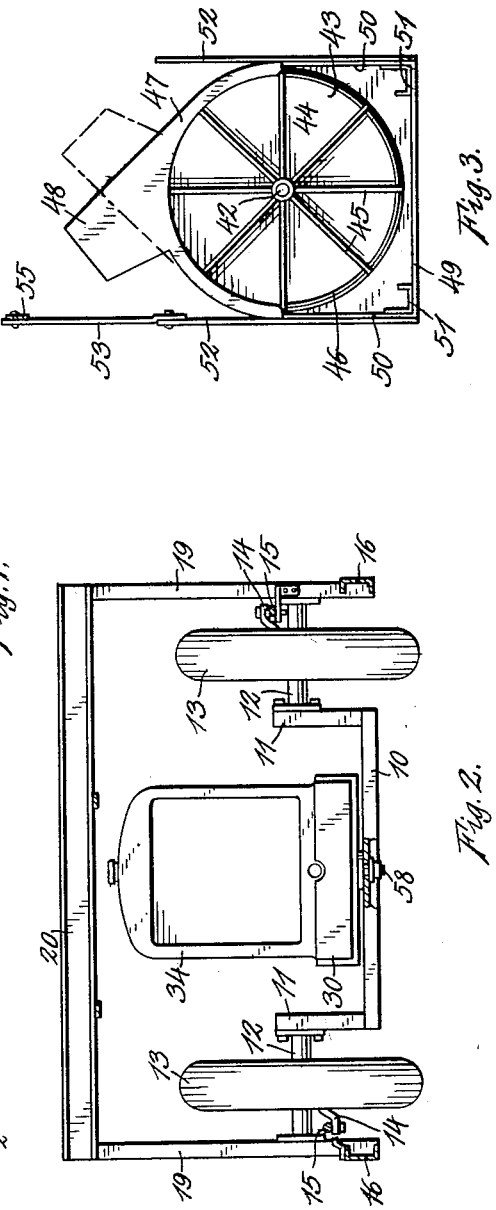
Inventor
Harleigh R. Holmes.
By
Attorney April 17, 1934. H. R. HOLMES 1,955,585
SNOWPLOW
Filed March 24, 1933 2 Sheets-Sheet 2
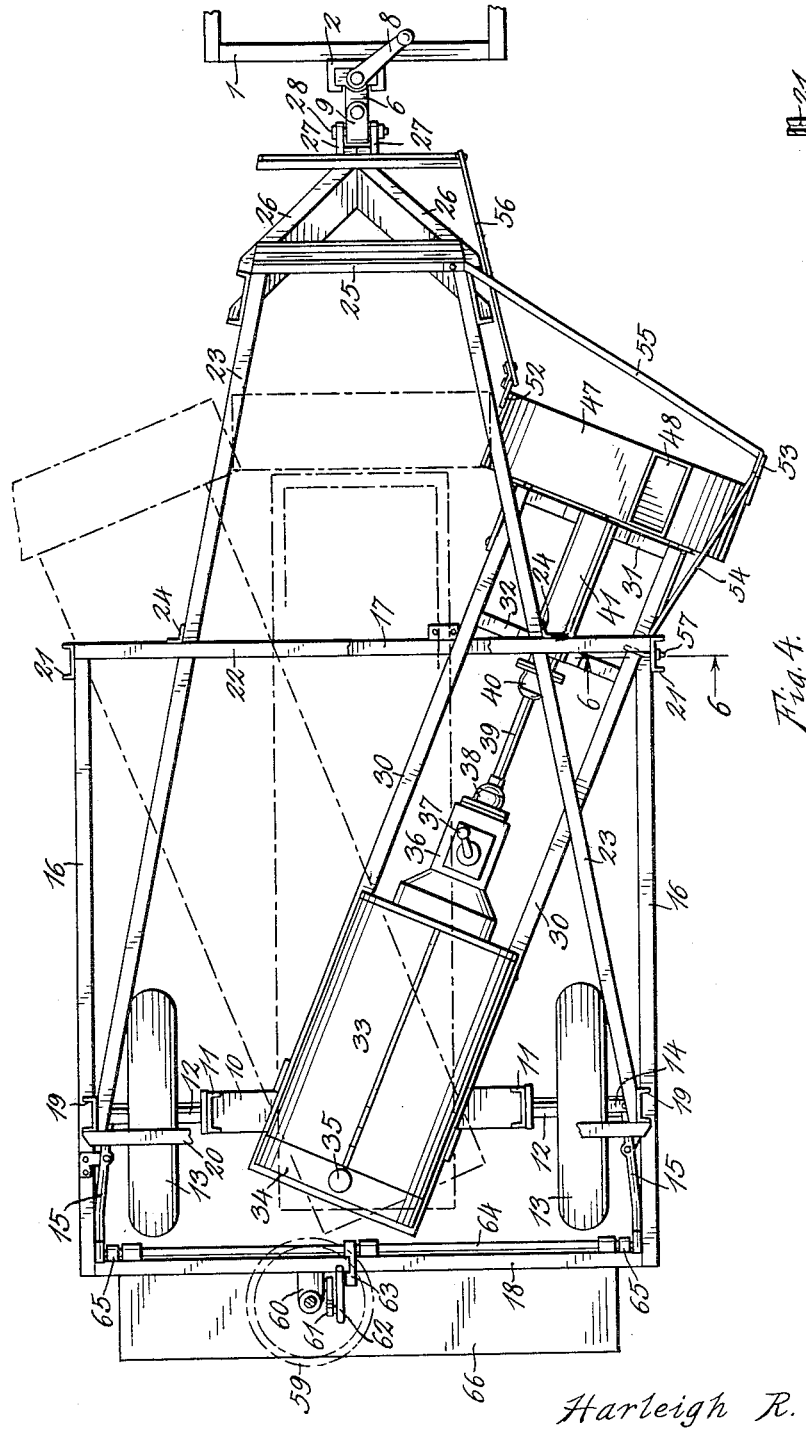
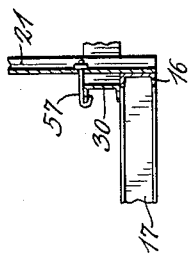
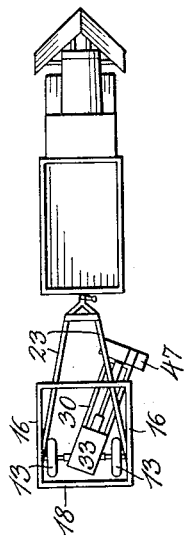
Inventor
Harleigh R. Holmes.
By A. J. O'Brian
Attorney Patented Apr. 17, 1934

1,955,585

UNITED STATES PATENT OFFICE 1,955,585

SNOWPLOW

Harleigh R. Holmes, Littleton, Colo.

Application March 24, 1933, Serial No. 662,468

12 Claims. (Cl. 37—43)

This invention relates to improvements in snow removing apparatus of the type employed for opening up highways and removing snow therefrom.

In many parts of our country the snowfall is quite extensive with the result that the highways, unless kept open by means of special snow removing machinery, will be impassable for automobiles and ordinary vehicles.

It is customary, wherever the snowfall is sufficiently heavy to interfere with traffic, for the highway departments to clear the roads after every snowstorm by means of some snow removing apparatus such as a truck provided at its front end with a push type snowplow which may be either a single straight blade or an A-type plow.

In the mountains and in places where the roads have been cut down below the surface of the ground a push type snowplow is unsatisfactory for the reason that it does not remove the snow, but simply pushes it to the side, and where the highway passes through a cut, it is impossible to get the snow properly removed by such an apparatus.

Even where the road is not below the surface of the ground, it often happens that very heavy snowdrifts occur which makes it very difficult to dispose of the snow with the ordinary push type snowplow.

The difficulties mentioned above have been recognized and various types of centrifugal snowplows have been designed, some of which operate quite successfully. But snowplows of this type are usually very expensive and require large amounts of money to be tied up in this special machinery which is only required to be used for a few days out of the year.

The highway departments of every state are usually well provided with heavy trucks that are so constructed that snowplows of the push type can readily be attached to them, but as above pointed out, such snowplows are unsatisfactory for use in cuts in heavy drifts and on mountain roads, and therefore it has heretofore been necessary to also provide a special rotary snowplow for use in such places.

It is the object of this invention to produce a rotary snow removing apparatus that can be attached to the rear end of a highway truck and which shall be provided with a rotary snow removing device which can be so adjusted that it will remove snow from the side of the cut made by the push plow and throw the same out of the cut and in this way it is possible to open roads in any position by means of a combination of the ordinary truck with its push type snowplow and a trailer provided with a rotary snowplow and which forms the subject of this invention.

In order to describe the invention in such a way that it may be readily understood, reference will now be had to the accompanying drawings in which the preferred embodiment thereof has been illustrated, and in which:

Fig. 1 is a side elevation of the trailer which carries the rotary snow removing apparatus and also shows a portion of the means for attaching it to the rear end of an ordinary highway truck, parts being shown in section to better disclose the construction;

Fig. 2 is a section taken on line 2—2, Fig. 1;

Fig. 3 is a view looking in the direction of arrow 3 in Fig. 1 and shows a front view of the centrifugal snow removing apparatus;

Fig. 4 is a top view of the trailer and shows also a portion of the highway truck to which it is attached, the several positions to which the snowplow can be adjusted have been indicated by dot and dash lines;

Fig. 5 is a top plan view showing the highway truck provided with an A-type snowplow and the trailer carrying the centrifugal snow removing apparatus; and Fig. 6 is a section taken on line 6—6 Fig. 4, and shows one way of anchoring the centrifugal snowplow device to the frame of the trailer.

In the drawings reference numeral 1 designates a part of the frame of an ordinary highway truck and 2 represents a casting which is secured to the truck and which is provided on opposite sides with guides 4 into which the projections 5 of the crosshead 6 extend. A screw 7 is rotatably mounted in the casting and has a threaded connection with the crosshead and is also provided at its top with a crank 8 by means of which it can be rotated for the purpose of raising and lowering a crosshead. The trailer which is attached to the crosshead by means of a universal connection comprising the U-shaped member 9 consists of a rear axle 10 which is shown best in Fig. 2. The ends of this axle are bent into vertical position as indicated by reference numeral 11. The upper ends of the vertical portions 11 carry outwardly extending shafts 12 which pass through the hub of the supporting wheels 13. The wheels are connected to the supporting shafts 12 by a universal connection similar to a binnacle that permits them to be adjusted for the purpose of steering the trailer, but as this particular connection is old and well known, it will not be described here. Each wheel is provided with an arm 14 to which a drag link 15 is secured for the purpose of steering the wheels in a manner which will be described more in detail in later parts of the specification. Supported on the rear axle is a frame having side members 16 which are preferably made from steel channels, and these are connected at their front ends by a transverse channel 17 and have a similar transverse connection 18 at the rear ends. The rectangular frame comprising members 16, 17 and 18 is suspended from the axle shafts 12 by means of vertical channels 19, as shown in Fig. 2. The vertical frame members extend upwardly above the wheels and are connected at their upper ends by a transverse channel 20. Extending upwardly from the front ends of the side members 16, are vertical channels 21 whose upper ends are connected by a transverse channel 22. Extending forwardly from the tops of the vertical channels 19 are two channel bars 23 that pass underneath the transverse channel 22 and are connected with the latter by means of brackets 24. The channels 23 are not parallel but converge inwardly and forwardly as shown in Fig. 4 and have their front ends connected by means of a transverse channel 25 as shown in Figs. 1 and 4. Extending downwardly from the front ends of channels 23 are two heavy steel channels 26, whose lower ends are brought into contact and electrowelded so as to form with the transverse bar 25 a triangle to whose apex are secured the two plates 27 that are connected with the U-shaped member 9 by means of a pin 28. Braces 29 extend from the bars 23 to the channels 26 as shown in Fig. 1. When the frame, which has just been described, is connected with the highway truck, the front end of the same can be raised and lowered by means of the screw 7 in a manner quite apparent from an inspection of Fig. 4. Supported on the trailer frame is another frame of elongated rectangular form and which has two side members 30 connected at their front ends by means of a transverse bar 31 and by means of another transverse bar 32. Supported on the rear end of the rectangular frame is an engine which has been shown as enclosed in the housing 33. Numeral 34 indicates the radiator that forms part of the cooling system of the engine, while 35 designates the cap for the fill opening of the radiator. The engine is provided with the usual type of transmission which is located in a housing 36 and has a lever 37 for shifting the gears. Extending forwardly from the universal 38 is a shaft 39 whose front end terminates in a universal 40, a tubular bearing 41 is supported on the two transverse bars 31 and 32 and extending through this bearing is a shaft 42 to which the rotor 43 is secured. The rotor has a round disk 44 that forms the rear wall thereof and radial ribs 45. The rotor is enclosed in a circular housing 46 that is provided at its top with a removable wall 47 having a spout 48. The part 47 and the spout can be reversed so as to occupy either the position shown in full lines in Fig. 3, or the position shown in dot and dash lines in this figure. Located below the housing 46 is a steel cutter bar 49 that has its ends supported by the vertical side members 50 to which it is attached by means of brackets 51. Vertical cutter bars 52 extend upwardly from opposite sides of the rotor housing and an extension cutter bar 53 is provided at one side for the purpose of cutting through drifts where the snow extends over the top of the bars 52. The bar 53 is secured to the frame of the trailer by means of a brace 54 and another brace 55 connects it with the front end of the frame comprising the inclined members 23. A plate 56 extends from the inner bar 52 to a point directly behind the wheel of the highway truck in the manner indicated in Fig. 1 by dot and dash lines and in Fig. 4 by full lines. Plate 56 tends to move the snow towards the centrifugal snowplow so that it will be removed by the latter.

In Fig. 5 the truck and the trailer have been shown in assembled relation and from this it will be seen that the centrifugal snowplow extends some distance to the outside of the truck so that it will widen the cut made by the push type plow attached to the truck. After the road has been opened by the push type plow, it can be widened by going back and forth with the assembly shown in Fig. 5. The centrifugal plow can be shifted from one side to the other as indicated in Fig. 4 and is anchored to the frame by means of a bolt 57 as shown in Fig. 6. This bolt has a hook that engages the flange of a transverse channel 20 of the elongated frame which supports the motor and the centrifugal snowplow. The motor and plow supporting frame are pivoted to the rear axle by means of a bolt 58 in the manner shown in Fig. 2.

The trailer is provided with a mechanism for steering the wheels 13 so as to facilitate turning and going around sharp corners. This steering mechanism comprises a steering post having a steering wheel 59 and which cooperates with a worm and worm wheel which are located in the casing 60 so as to turn the crank arm 61. This arm is connected by means of a link 62 to a crank 63 carried by the shaft 64 and the crank arms 65 that are carried by this shaft are connected with the links 15. By turning the wheel 59 the wheels 13 can be turned about vertical axes so as to facilitate turning as above described. The man who controls the operation of the trailer is supported on the platform 66.

In the drawings the trailer has been shown as supported on wheels 13 which is preferable because it frequently happens that the snowplow must be transported over roads free from snow, as in mountainous countries where the snow falls early and remains late in the spring. Where it is practical the wheels 13 can be replaced by sled runners somewhat like those shown in U. S. Letters Patent 1,824,662.

From the above description it will be apparent that a very effective snow removing apparatus can be obtained by attaching the trailer described above to an ordinary highway truck provided with a push type snowplow. The machine can be used in any place where any other snow removing apparatus can be used and can also be used very effectively where the roads extend through deep cuts and in mountains where the snow can only be delivered to one side of the road. By the pivot arrangement of the frame which supports the rotary snowplow and the motor the road can be widened on either side at will. If the first cut through the road is made to one side, it can be widened by going back and forth along one side of the road and shifting the rotor plow at each end of the cut.

When the machine is to be transported for some distance the snowplow supporting frame is moved to a central position as shown in Fig. 4 and the front end is raised by means of the screw 7 and the apparatus can then be transported over the road at any reasonable speed.

Having described the invention what is claimed as new is:

1. A snow removing apparatus for use in opening and removing snow from highways, comprising, in combination, a tractor, a push type snow plow secured to the front end thereof, a trailer connected with the rear end of the tractor, and a rotary snowplow attached to the trailer by means which permits it to be moved to either side of the trailer while it remains attached thereto whereby it can be shifted into position to remove the snow from either side of the cut made by the push type snow plow.

2. A snow removing apparatus for use in opening and removing snow from highways, comprising, in combination, a tractor, a push type snow plow secured to the front end thereof, a trailer connected with the rear end of the tractor, a motor and rotary snow plow frame carried by the trailer, a motor secured to the rear end of the frame, a snow plow having a rotary element secured to the front end of the frame, the rear end of the frame being pivoted to the trailer, means for movably supporting the front end of the frame and which permits the frame to be turned about its pivot, and means for turning the rotary element by means of power derived from the motor.

3. A centrifugal snow plow comprising, in combination, a frame having means at one end for supporting it on a roadbed, means at the other end for attaching it to a tractor, a motor frame pivotally connected with the first mentioned frame, a rotary snow removing means carried by the front end of the motor frame, and means for operating the rotary portion of the snow removing means from power derived from the motor.

4. A snow removing apparatus for use on highways, comprising, in combination, an axle, a supporting wheel at each end of the axle, a frame having one end attached to the axle, means at the other end of the frame for attaching it to a tractor, a second frame also supported by the axle, the front end of the second frame being carried by a transverse member of the first frame, the second frame being pivoted to turn about a vertical pivot, a motor carried by the second frame, a rotary snow plow carried by the front end of the second frame, and means for turning the rotary element of the snow plow by power derived from the motor.

5. A snow removing apparatus for use on highways comprising, in combination, an axle, a supporting wheel at each end of the axle, a frame having its rear end supported by the axle, means at the front end of the frame for attaching it to a tractor, a motor and snow plow supporting frame having its rear end supported by the axle and connected with the latter by means of a vertical pivot, a transversely extending bar carried by the first frame, the front end of the second frame being supported by the transverse bar, a snow plow housing carried by the front end of the second frame, a rotary snow plow element located in the housing, and means for turning the rotary element by power derived from the motor.

6. A machine for opening highways and removing snow therefrom, comprising, in combination, a tractor having a push type snow plow attached to its front end, and a trailer hitched to its rear end, the trailer comprising, an axle, a supporting wheel at each end of the axle, a frame having its rear end attached to the axle, the front end of the frame having means for attaching it to the trailer, a snow plow and motor supporting frame carried by the axle and the first mentioned frame, the rear end of the second mentioned frame being mounted for movement about a vertical pivot, the first mentioned frame member having a transversely extending bar which serves as a support for the front end of the second mentioned frame, a motor carried by the last mentioned frame, a rotary snow plow carried by the front end of the second mentioned frame, and means for operating the rotatable element of the snow plow by power derived from the motor.

7. A machine for opening highways and removing snow therefrom comprising, in combination, a tractor having a push type snow plow attached to its front end, and a trailer hitched to its rear end, the trailer comprising, an axle, a frame having its rear end supported by the axle and its front end connected to the tractor, supporting wheels at the ends of the axle, the frame having a transverse supporting bar near its front end, a second frame having its rear end supported by the axle and pivotally connected therewith and its front end movably supported by the transverse bar, the second frame, when in operative position, making an angle with the longitudinal axis of the tractor and trailer, a motor carried by the second frame, a rotary snow plow carried by the front end of the second frame, a rotor forming part of the snow plow, and means for turning the rotor by power derived from the motor.

8. A machine for opening highways and removing snow therefrom, comprising, in combination, a tractor having a push type snow plow attached to its front end, and a trailer hitched to its rear end, the trailer comprising, an axle, a frame having its rear end supported by the axle and its front end connected to the tractor supporting wheels at the ends of the axle, the frame having a transverse supporting bar near its front end, a second frame having its rear end supported by the axle and pivotally attached to it and its front end movably supported by the transverse bar, the second frame, when in operative position, making an angle with the longitudinal axis of the tractor and trailer, a motor carried by the second frame, a rotary snow plow carried by the front end of the second frame, a rotor forming part of the snow plow, means for turning the rotor by power derived from the motor, and means for moving the supporting wheels for the purpose of guiding the truck.

9. A snow removing device comprising, in combination, a tractor, a trailer attached to the rear end of the tractor, the trailer comprising an axle having a supporting wheel at each end, a frame having its rear end supported by the axle, a second frame pivotally attached to the trailer frame, a motor carried by the second frame, a rotary snow plow carried by the front end of the second frame, means for adjustably supporting the front end of the trailer frame from the tractor, means for operating the rotary snow plow from power derived from the motor, and means for steering the supporting wheels of the trailer.

10. A snow removing device comprising, in combination, a tractor having a push type snow plow secured to its front end, a trailer attached to the rear end of the tractor, the trailer comprising a frame, means for supporting the rear end of the frame above a roadbed, means at the front end of the frame for attaching it to the tractor, a rotary snow plow carried by the trailer frame adjacent the front end thereof, the rotary plow being secured to the frame of the trailer by means which permits it to be shifted from one side to the other without disconnecting it from the trailer, a motor carried by the trailer, and means for transmitting power from the motor to the rotor of the rotary snow plow regardless of which side of the trailer the latter is located.

11. A centrifugal snowplow comprising, in combination, a frame having means at one end for supporting it on a roadbed, means at the other end for attaching it to a tractor, a motor frame movably connected with the first mentioned frame, a rotary snow removing means carried by the front end of the motor frame, and means for operating the rotary portion of the snow removing means from power derived from the motor.

12. A device for removing snow from highways, comprising, in combination, an axle, a supporting device at each end of the axle, a frame having one end supported on the axle, means at the other end of the frame for attaching it to a tractor, a second frame supported on the first frame, the first frame having a transverse bar for adjustably supporting the second frame, a rotary snowplow attached to the front end of the second frame which is movable transversely of the first frame to bring the snowplow into operative position on either side of the first mentioned frame, a motor also supported by the first mentioned frame and the axle, and means for transmitting motion from the motor to the rotary element of the snowplow.

HARLEIGH R. HOLMES.